(12) United States Patent
Sakaguchi

(10) Patent No.: US 12,480,439 B2
(45) Date of Patent: Nov. 25, 2025

(54) OPPOSED-PISTON INTERNAL COMBUSTION ENGINE

(71) Applicant: UMU DEVISING LLC, Tochigi (JP)

(72) Inventor: Eiji Sakaguchi, Tochigi (JP)

(73) Assignee: UMU DEVISING LLC, Tochigi (JP)

( * ) Notice: Subject to any disclaimer, the term of this patent is extended or adjusted under 35 U.S.C. 154(b) by 0 days.

(21) Appl. No.: 18/863,952

(22) PCT Filed: Aug. 15, 2022

(86) PCT No.: PCT/JP2022/031473
§ 371 (c)(1),
(2) Date: Nov. 7, 2024

(87) PCT Pub. No.: WO2023/238418
PCT Pub. Date: Dec. 14, 2023

(65) Prior Publication Data
US 2025/0305446 A1    Oct. 2, 2025

(30) Foreign Application Priority Data

Jun. 6, 2022  (JP) .................................. 2022-100714

(51) Int. Cl.
*F01B 7/12*   (2006.01)
*F01L 1/08*   (2006.01)
(Continued)

(52) U.S. Cl.
CPC ............... *F02B 75/28* (2013.01); *F01L 1/08* (2013.01); *F01L 1/18* (2013.01); *F01L 7/02* (2013.01); *F02F 3/00* (2013.01)

(58) Field of Classification Search
CPC .... F02B 75/065; F02B 75/002; F02B 75/282; F01B 11/001
(Continued)

(56) References Cited

U.S. PATENT DOCUMENTS 2,158,532 A     5/1939  Bullen
9,453,459 B2 *  9/2016  Horsch ..................... F01B 7/02
(Continued)

FOREIGN PATENT DOCUMENTS

JP    S58122325 A    7/1983
JP    S60132030 A    7/1985
(Continued)

OTHER PUBLICATIONS

International Search Report issued in corresponding International Application No. PCT/JP2022/031473, dated Oct. 25, 2022, pp. 1-6, Japan Patent Office, Tokyo, Japan.

*Primary Examiner* — Hung Q Nguyen
*Assistant Examiner* — James J Kim
(74) *Attorney, Agent, or Firm* — HAUPTMAN HAM, LLP

(57) ABSTRACT

In an opposed-piston mechanism, an intake compression cylinder and an expansion exhaust cylinder are individually provided, and a rotating perforated columnar valve and an ignition combustion chamber are formed therebetween. A valve mechanism is arranged on a cylinder side surface side, and a disk cam that moves in conjunction with crank rotation operates an intake valve and an exhaust valve on a cylinder side surface via a movable fulcrum type rocker arm. A movable structure of the rocker arm also realizes opening/closing amounts of the intake valve and the exhaust valve according to an operating situation of an engine. Since a piston pin and a piston pin can absorb variations of an engine that occur when two connecting rods are connected to one piston, the two connecting rods can be easily connected to the one piston.

3 Claims, 9 Drawing Sheets

(51) Int. Cl.
   *F01L 1/18*          (2006.01)
   *F01L 7/02*          (2006.01)
   *F02B 75/28*         (2006.01)
   *F02F 3/00*          (2006.01)

(58) Field of Classification Search
   USPC .................................................... 123/51 R
   See application file for complete search history.

(56) References Cited

U.S. PATENT DOCUMENTS

| | | | |
|---|---|---|---|
| 9,915,188 B2* | 3/2018 | Koszewnik | ............... F04B 3/00 |
| 10,066,545 B2* | 9/2018 | Klyza | .................. F02D 41/3094 |
| 2012/0055443 A1 | 3/2012 | Betzmeir et al. | |

FOREIGN PATENT DOCUMENTS

| | | |
|---|---|---|
| JP | H0225062 B2 | 5/1990 |
| JP | H03246325 A | 11/1991 |
| JP | H05163914 A | 6/1993 |

* cited by examiner

OPPOSED-PISTON INTERNAL COMBUSTION ENGINE

The present application is a U.S. National Phase of International Application Number PCT/JP2022/031473, filed Aug. 15, 2022, which claims priority to Japanese Application No. 2022-100714, filed Jun. 6, 2022.

TECHNICAL FIELD

The present invention relates to an internal combustion engine using an opposed-piston crank mechanism.

BACKGROUND ART

An opposed-piston crank mechanism can convert the pressure of combustion gas into kinetic energy by opposed pistons. Since the energy released as heat to a cylinder head and components thereof in the conventional heat engine can be recovered as kinetic energy, heat efficiency is improved. However, in the opposed-piston crank mechanism, a portion corresponding to the cylinder head of the conventional engine is the piston on the opposite side, and therefore, an overhead-type valve mechanism that is widely adopted cannot be formed. In order to constitute an opposed-piston mechanism, it is necessary to significantly change the arrangement and structures of intake and exhaust valves, a spark plug, and a fuel injector of the cylinder head in the conventional internal combustion engine.

An engine operation at low rotation is effective with respect to reduction in fuel consumption, because the number of times of combustion per hour is reduced. However, the operation at low rotation leads to discomfort during engine operation and damage to the engine due to vibration caused by the unbalanced inertial force of the piston and the connecting rod. With respect to the unbalanced inertial force, there is devised a method of cancelling the inertia couple generated during conversion of reciprocating movement into the rotational movement by adding and symmetrically disposing pistons, cranks, and connecting rods facing each other. However, the number of components increases, high dimensional accuracy is required of the components for securing symmetry and between the components, and the mechanism is also complicated.

CITATION LIST

Patent Literature

Japanese Patent Publication (B2) 2-25062

SUMMARY OF INVENTION

Technical Problem

Since each of the steps of intake, compression, combustion, expansion, and exhaust is performed in the same cylinder in the conventional mechanism, components such as a valve mechanism, a spark plug, and a fuel injector that are required in each of the steps are concentrated on the cylinder head. In the case of an opposed-piston mechanism having no cylinder head, efficient arrangement of these devices is important.

In the mechanism in which connecting rods and cranks are symmetrically arranged, the rods and cranks are further arranged to face each other, and inertial balance is kept, a deviation occurs in a position where the piston is connected to the connecting rod due to dimensional variations of the components composing the engine, dimensional variations among the components, a gear gap and the like. This deviation hinders smooth movement of the piston.

Solution to Problem

A cylinder 1 for intake compression and a cylinder 2 for expansion exhaust are provided in parallel. Further, between the cylinder 1 for intake compression and the cylinder 2 for expansion exhaust, a rotating perforated columnar valve 3 and an ignition combustion chamber 4 for introducing and hermetically sealing compressed air are provided. The cylinder 1 for intake compression and the ignition combustion chamber 4 have an introduction hole 27. In a state where the rotating perforated columnar valve 3 is opened, high-pressure air compressed in the cylinder 1 for intake compression passes through the introduction hole 27 and the rotating perforated columnar valve 3 and is introduced into the ignition combustion chamber 4. The rotating perforated columnar valve 3 is given airtightness by continuous ring-shaped seal 5 and seal 6 that hermetically seal an outer periphery of the introduction hole, and a ring seal 20 and a ring seal 21 that are arranged in recessed shapes on a column side surface of the rotating perforated columnar valve 3. The seal 5 and seal 6 are brought into close contact with the column side surface by a leaf spring 22 and lubricating oil pressure from a back surface. The rotating perforated columnar valve 3 has ring grooves 23 holding the ring seal 20 and the ring seal 21 for securing airtightness, lubrication and cooling. Lubricating oil supply holes 24 are formed inside the grooves to supply lubricating oil to the ring seal 20 and the ring seal 21. In the ignition combustion chamber 4, a fuel injection device 25 and a spark plug 26 are set. A combustion gas ejection hole 44 for introducing combustion gas generated in a combustion chamber of the ignition combustion chamber 4 into the expansion exhaust cylinder 2. In the case of corresponding to multi-stage fuel injection when necessary, a multi-stage fuel injection device 28 is set for the cylinder 2 for expansion exhaust. Combustion by this mechanism occurs once per one crank rotation and contributes to securement of output.

For the valve mechanism of intake and exhaust, a disk cam 7 having an uneven shape on a disk surface of a column that rotates synchronously with the crankshaft is provided. An amount of this unevenness has an uneven shape in a diameter direction in addition to a circumferential direction. A rocker arm 8 has a contact roller 9 at a contact point with the disk cam 7, and swings in this principle according to the unevenness of the disk cam 7. A rocker arm holder 11 holding the rocker arm 8 has a rocker arm pin 12 that serves as a fulcrum when swings and moves the rocker arm, and has a gear shape meshing with an input gear 13 operating to adjust intake and exhaust to linearly move on a guide rail 29. Since the contact point of the disk cam 7 and the contact roller 9 moves by operation of the input gear 13, and the disk cam also changes in the amount of unevenness in the diameter direction, the swing amount of the rocker arm changes with this. Since the distance between the valve contact point and the fulcrum also changes at the same time, this also has an effect of changing the moving amount of the valve. By operating the input gear 13, the opening/closing amount of the valve can be changed.

The piston pin is divided into two piston pins that are a piston pin 18 and a piston pin 30, which are arranged at both ends of a pin central axis. In addition, each of the piston pins has two circular holes joined to a connecting rod connection pin 17 and a connecting rod connection pin 32 and is connected to two connecting rods, a connecting rod 16 and a connecting rod 31, that are symmetrically arranged. The connecting rods are connected to a crank 19 and a crank 35 that are similarly arranged symmetrically. Outer peripheries of the piston pins 18 and 30 are circular and rotate with respect to the piston. Since the two connecting rods to be connected have parts where related components are different in the process of respectively transmitting power to the output shaft of power, a deviation occurs to the positions of the connecting rod connection pin 17 and the connection pin 32 due to a dimensional variation of each of the components and dimensional variations of gears in the engine, but rotation of the piston pin 18 and the piston pin 30 absorb the deviation and minimize the influence of the aforementioned variations.

Advantageous Effects of Invention

Since introduction and interruption of the compressed air are performed by the rotation operation of the rotating perforated columnar valve 3, it is possible to separate the cylinder 1 for intake compression and the cylinder 2 for expansion exhaust with a simple structure and a slight power loss. Each of the cylinders can have an optimal volume for a required engine output, it is possible to set volumes on an intake side and an exhaust side without using a complicated mechanism or control, and combustion efficiency is improved. Further, since the number of times of combustion per one rotation of the crank is one time, the output is improved, and pulsation of the output during low-rotation operation is also reduced.

The ignition combustion chamber 4 can take a spherical shape, and combustion becomes ideal flame propagation. Unburned fuel is reduced, which contributes to high output, and purification of exhaust gas. Since the combustion chamber has a compact and simple structure, and it is possible to easily replace a material of this portion with a heat resistant and pressure resistant material, a corrosion resistant material, and a high heat insulating material when necessary, it is possible to easily cope with high temperature and high pressure combustion and various fuels.

A valve mechanism of a movable fulcrum type rocker arm can change an opening/closing timing of the valve and a lift amount of the valve according to an accelerator operation and a load situation of the engine and can achieve both reduction of fuel consumption and output securement when necessary. The simple and compact mechanism facilitates arrangement of the valve opening/closing mechanism on the cylinder side surface side and contributes to establishment of the opposed-piston crank mechanism.

In the engine having a plurality of connecting rods for one piston, a positional deviation that occurs to the piston connection point of the connecting rod is caused due to factors such as dimensional tolerance difference of the respective components, and the gap in the internal gears, but the piston can smoothly move linearly with respect to the cylinder similarly to the conventional engine without being affected by the aforementioned variations as a result of the piston pin 18 and the piston pin 30 absorbing the deviation by the rotation with respect to the piston.

BRIEF DESCRIPTION OF DRAWINGS

FIG. 1 is a view in which a cylinder central axis is vertical. A crank angle is in a state of a piston top dead center, and a hole of a rotating perforated columnar valve 3 is in a state of coinciding with a conduction hole 27 of an intake compression cylinder 2 and an ignition combustion chamber 4 to introduce compressed gas into the ignition combustion chamber 4.

FIG. 3 shows a state of ignition and combustion where the rotating perforated columnar valve 3 is closed, a fuel injection device 25 and a spark plug 26 are operated. Black line arrows represent a fuel during combustion.

FIG. 12 is a view of the valve mechanism in a state where a valve opening/closing amount becomes small at the same crank angle as in FIG. 11.

DESCRIPTION OF EMBODIMENTS

The present invention can be carried out as power using an internal combustion engine of an automobile, a generator or the like. The embodiment will be shown by the following example.

EXAMPLE

Figure 1:
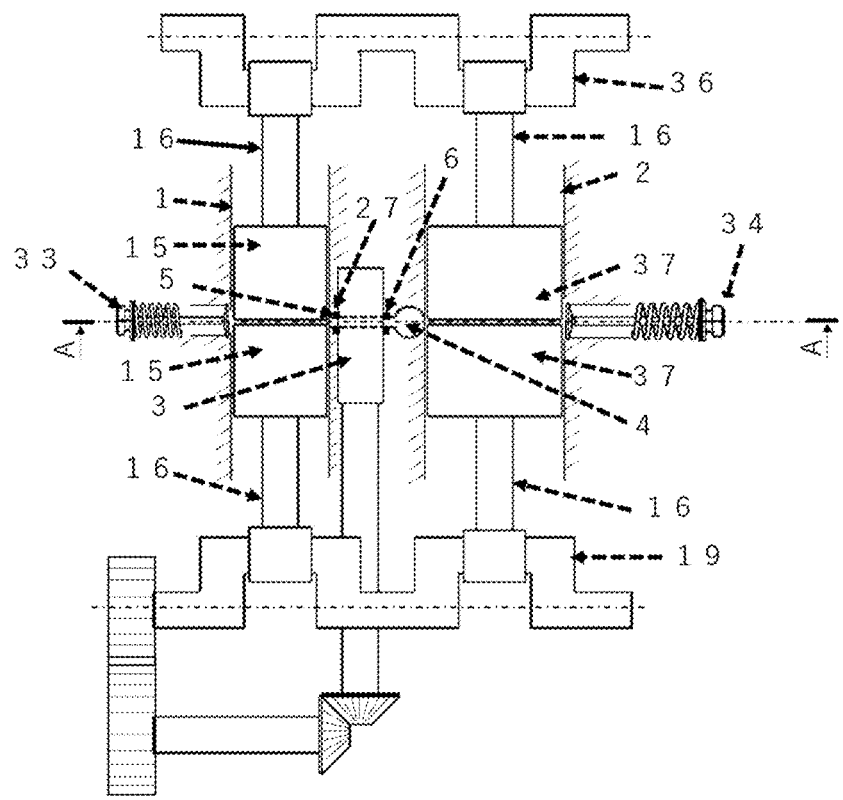
FIG. 1 is a mechanism arrangement conceptual diagram related to the present invention.
Figure 2:
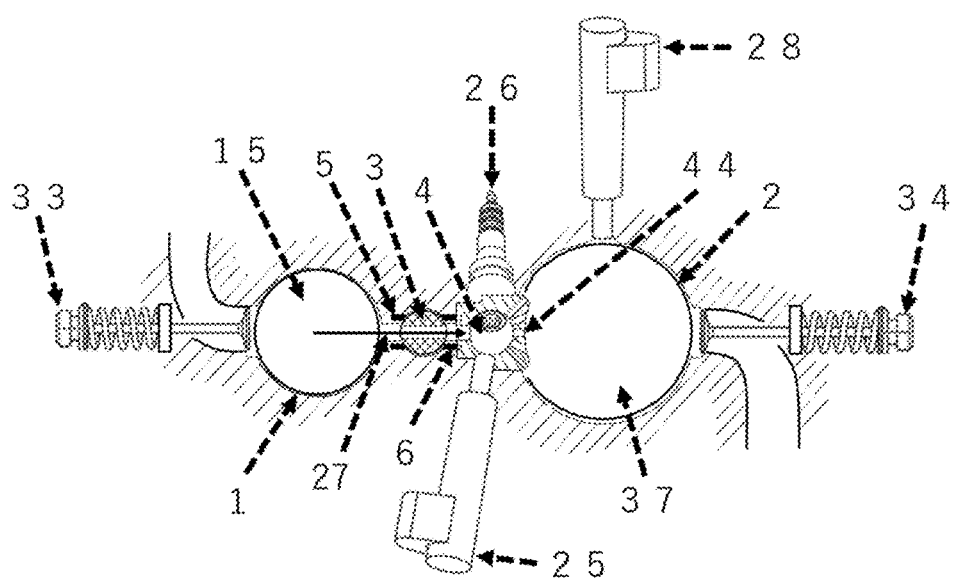
FIG. 2 is a sectional view taken along line A-A in FIG. 1 when the rotating perforated columnar valve 3 is opened. Air pressurized by an intake compression cylinder 1 is introduced into the ignition combustion chamber 4. A black line arrow represents a flow of high-pressure air.
Figure 3:
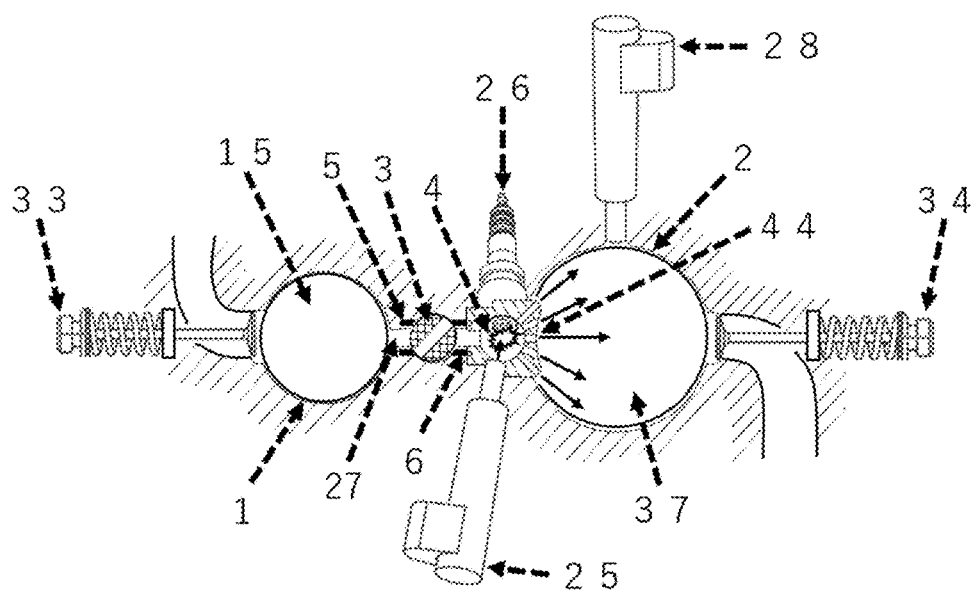
FIG. 3 is a sectional view taken along line A-A in FIG. 1 at the time of an ignition combustion state that is a state where the process proceeds from the state in FIG. 2.
Figure 4:
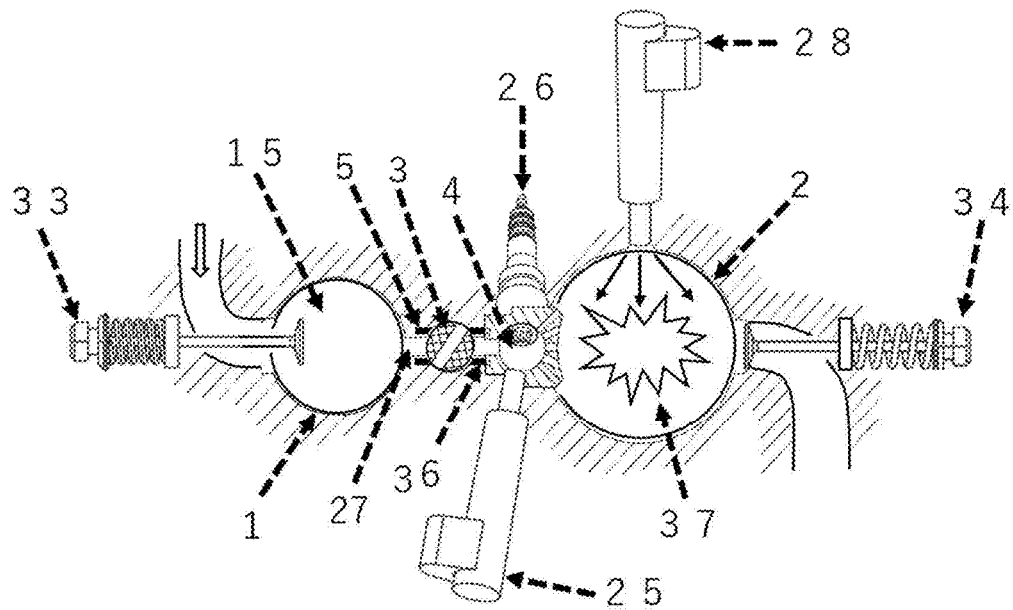
FIG. 4 is a sectional view taken along A-A line in FIG. 1 during intake and expansion steps and multi-stage fuel injection in a state where the process proceeds from the state of FIG. 3. A white arrow represents intake air. Black arrows represent the fuel during combustion.
Figure 5:
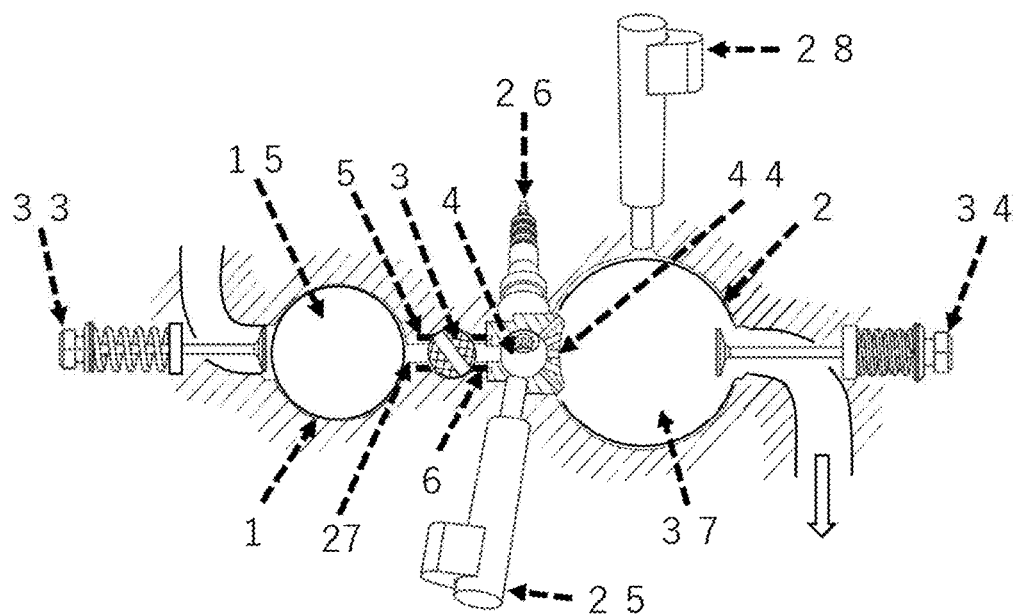
FIG. 5 is a sectional view taken along A-A in FIG. 1 when the crank angle passes through a piston bottom dead center and reaches compression and exhaust steps in a state where the process proceeds from the state in FIG. 4. A white arrow represents exhaust gas. Thereafter, the process returns to FIG. 2, and one cycle is achieved by one rotation of the crank.
Figure 6:
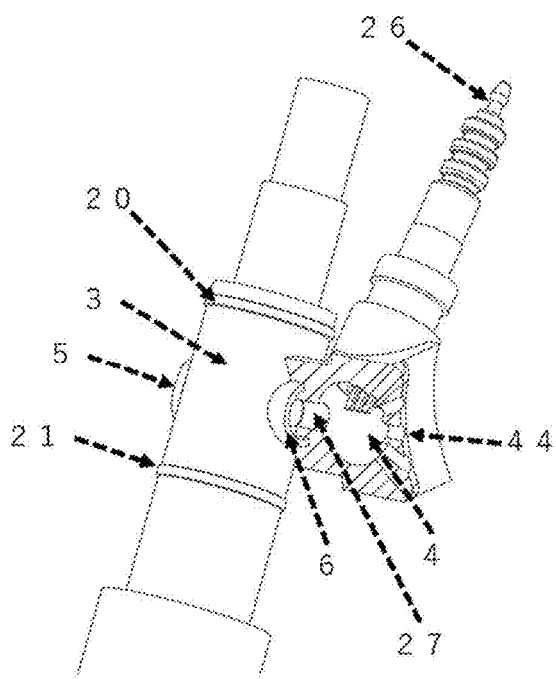
FIG. 6 is a configuration view of the rotating perforated columnar valve, and the ignition combustion chamber. In order to facilitate understanding of the ignition combustion chamber, a half of the chamber is omitted from a center.
Figure 7:
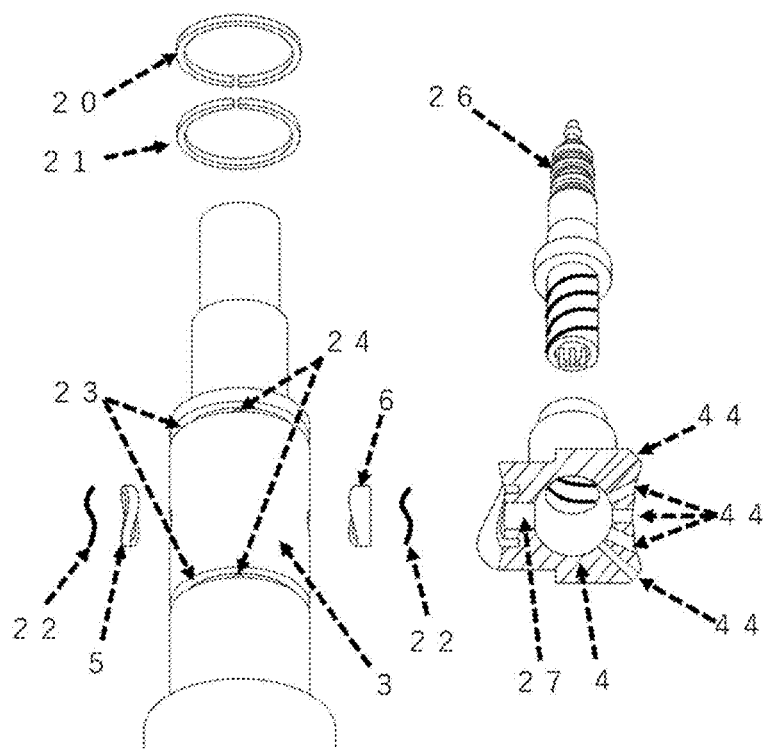
FIG. 7 is an exploded view of the rotating perforated columnar valve and the ignition combustion chamber. In order to facilitate understanding of the ignition combustion chamber, a half of the chamber is omitted from the center.
Figure 8:
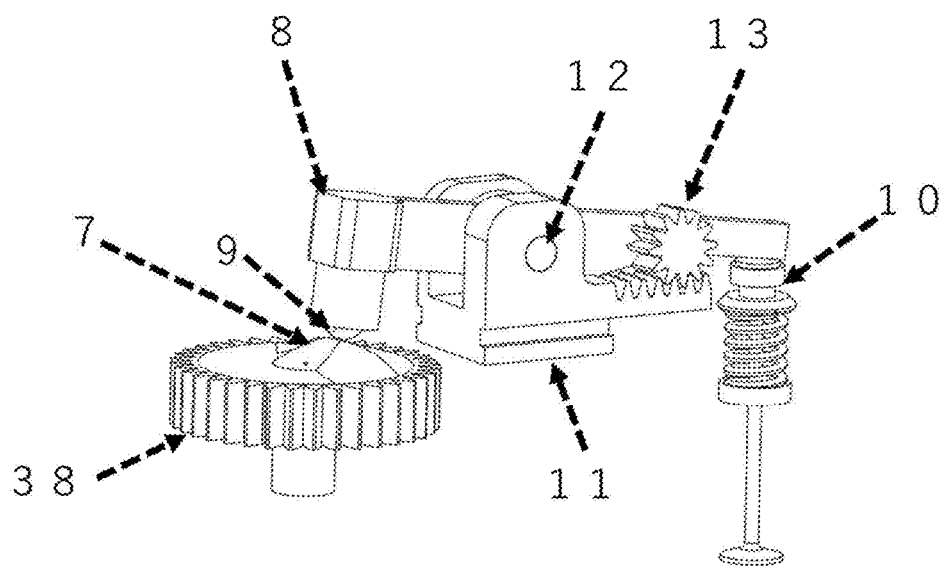
FIG. 8 is a configuration view of a valve mechanism. A disk cam 7 is integrated with a gear 38.
Figure 9:
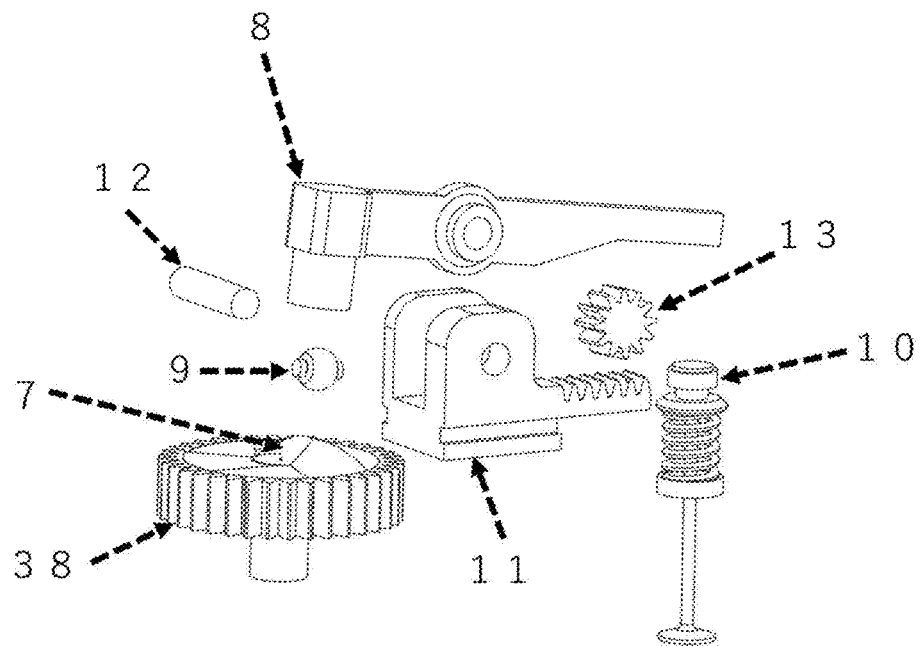
FIG. 9 is an exploded view of the valve mechanism at a time of using a cam contact roller 9.
Figure 10:
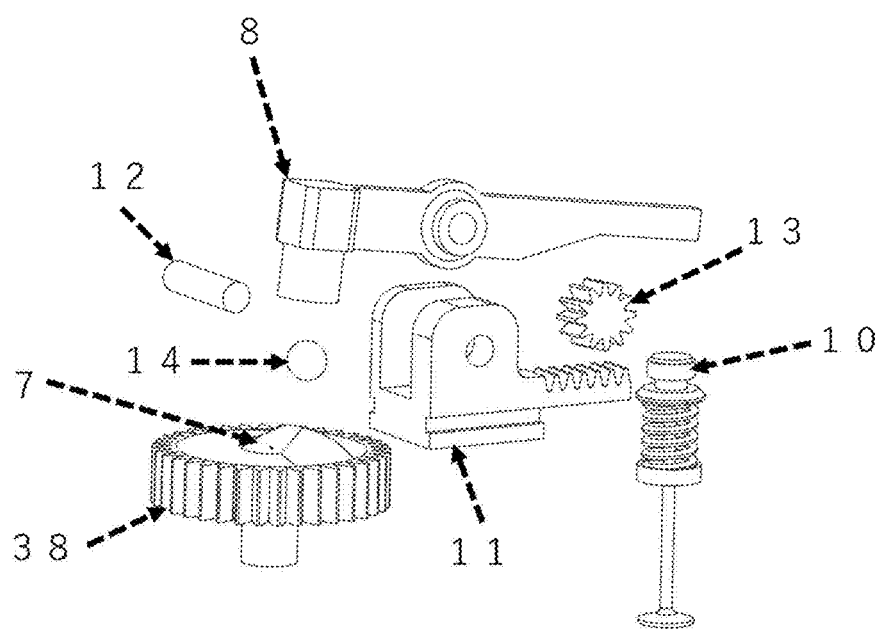
FIG. 10 is an exploded view of the valve mechanism when a cam contact ball 14 is used.
Figure 11:
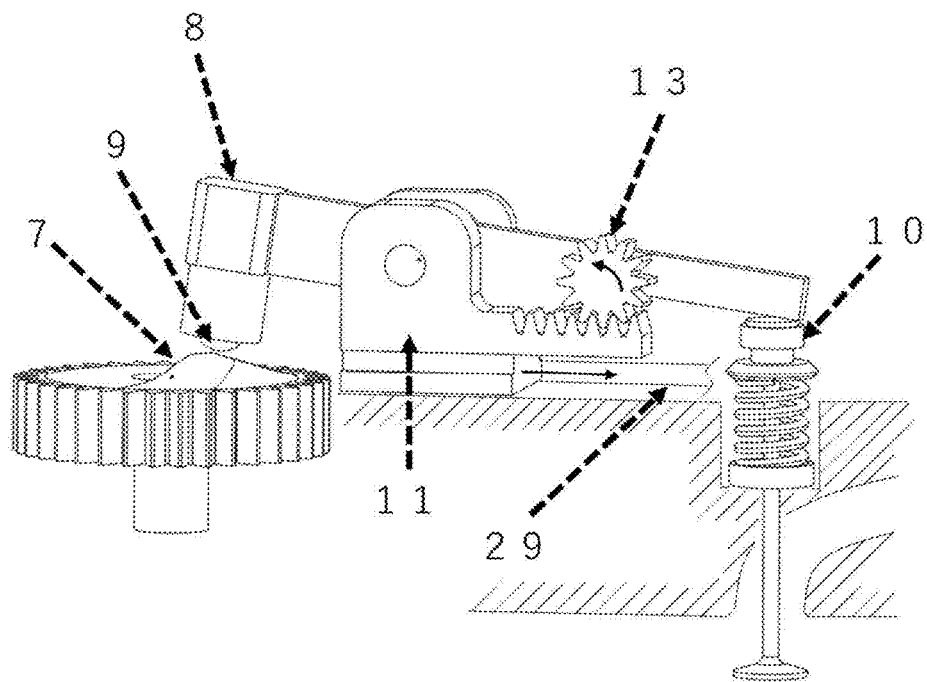
FIG. 11 is a view of the valve mechanism when the cam contact roller 9 is in contact with a largest protrusion portion of the disk cam 7 at a crank angle at which a valve opening degree is large.
Figure 12:
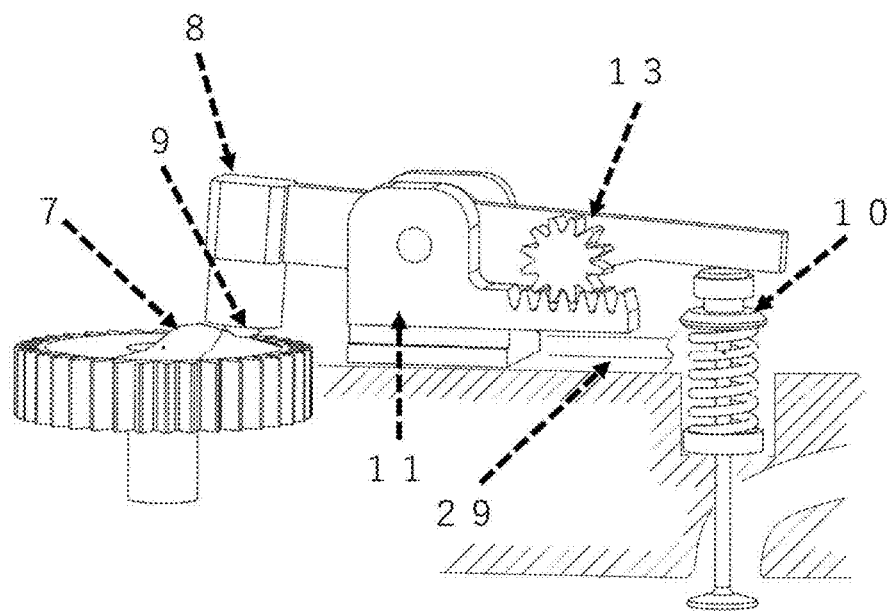
In FIG. 12, with respect to the state in FIG. 11, a cam contact position is also moved as a result of a rocker arm holder 11 moving by an operation of an input gear 13, and the cam contact roller 9 contacts the disk cam 7 at a location where a cam protrusion amount of the disk cam 7 is small.
Figure 13:
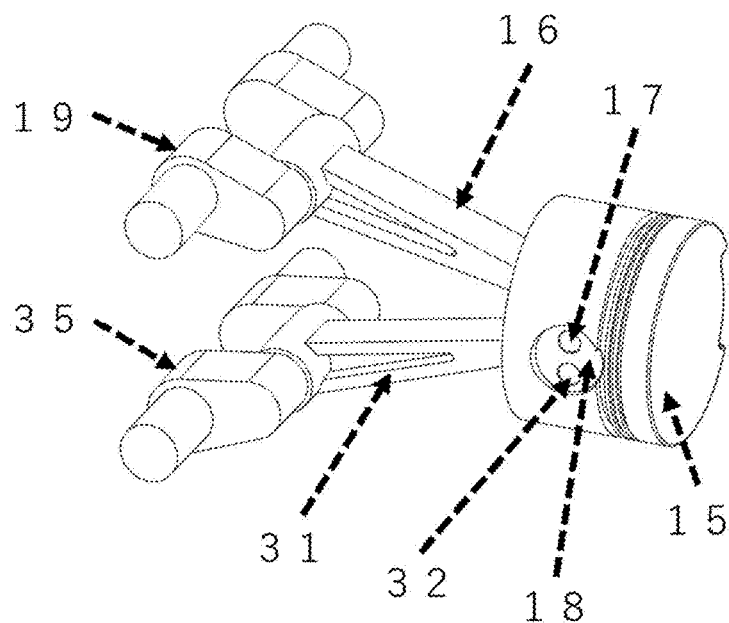
FIG. 13 is a configuration view of a piston pin and peripheral components.
Figure 14:
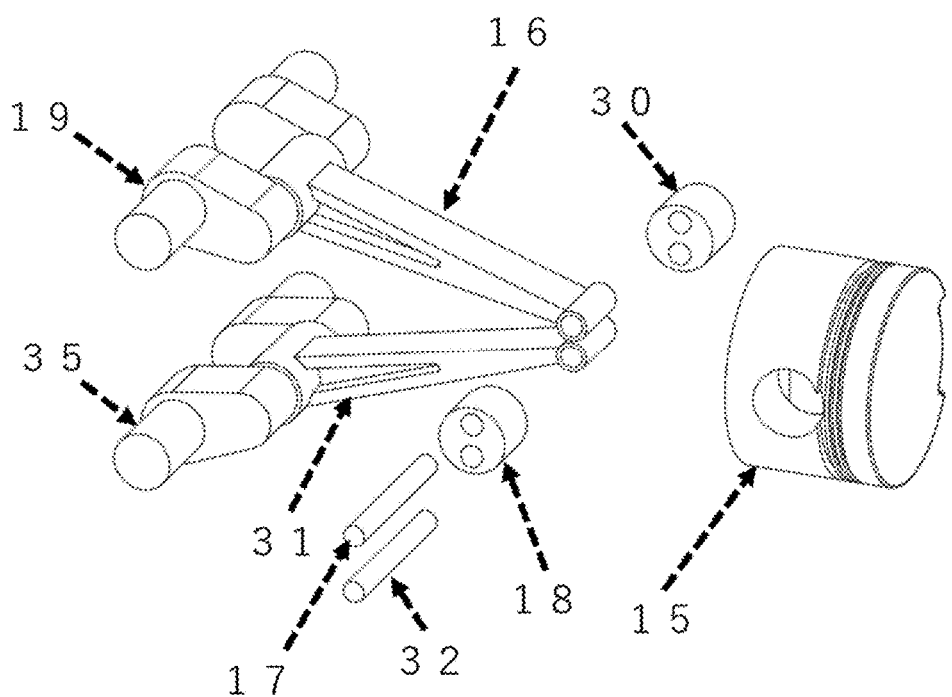
FIG. 14 is an exploded view of the piston pin and the peripheral components.
Figure 15:
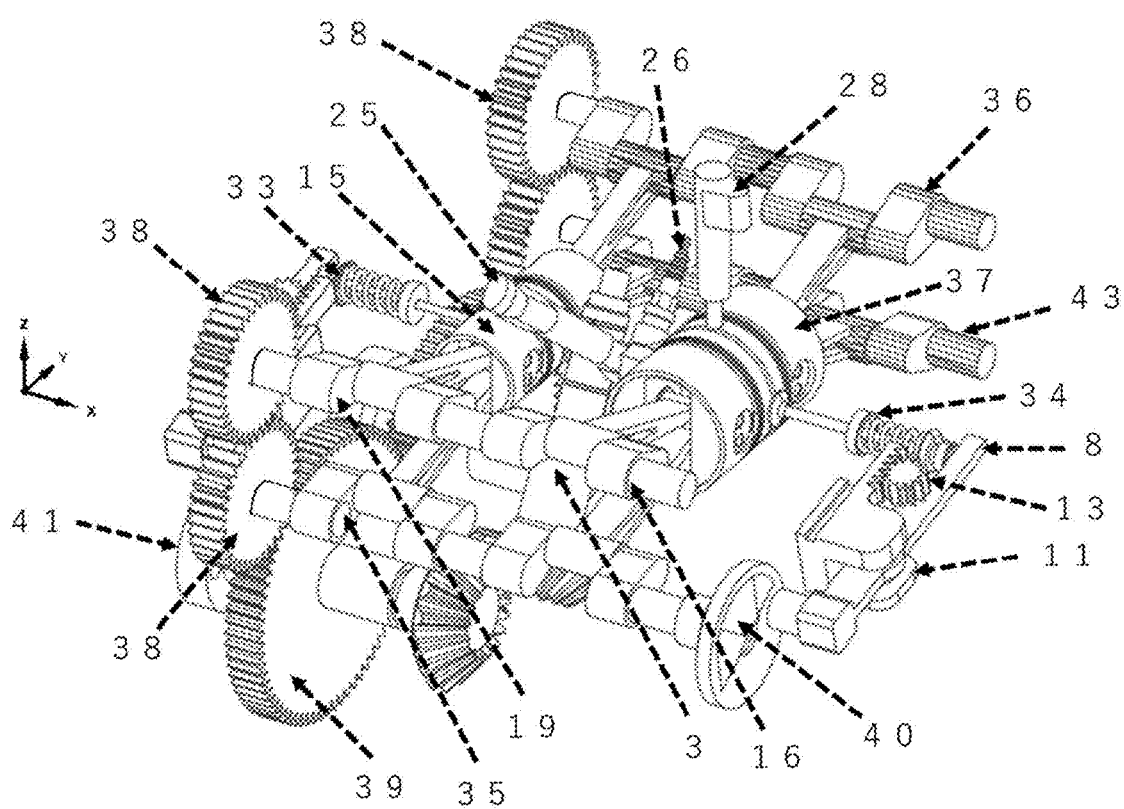
FIG. 15 is a view of an example seen from an exhaust valve side.
Figure 16:
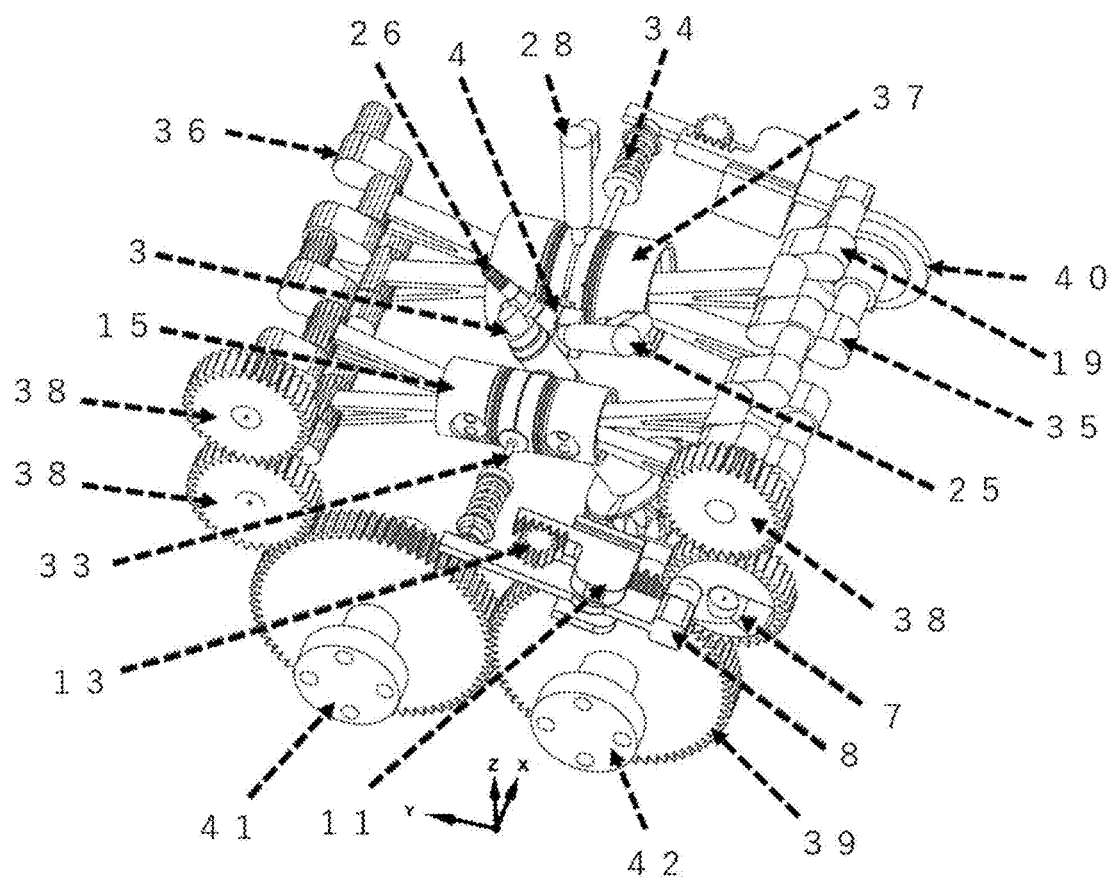
FIG. 16 is a view of the example seen from an intake valve side.

FIG. 15 and FIG. 16 show an example. In order to facilitate understanding of the configuration, a crankcase and a cylinder formed by the crankcase are omitted. An intake compression cylinder and an expansion exhaust cylinder are horizontally arranged. Two intake pistons 15 are arranged to face each other, two pistons 37 are arranged to face each other similarly for expansion and exhaust steps, and the respective pistons are respectively connected to the two connecting rods. Four cranks in total are located in symmetrical and facing positions, and are moved in conjunction with each other by gears 38 and 39. Disk cams 7 and 40 are arranged at terminal ends of the crank, and the valve mechanism is arranged on a cylinder side surface side. An input gear 13 is operated by an engine operation control device. When an operation environment is monotonous, the input gear 13 is operated in association with a throttle operation. Since the vibration due to imbalanced inertia of the piston and the connecting rod that is the cause of the vibration in the conventional engine is cancelled by the symmetric arrangement in the present example, a balancer is not installed. Two output shafts that are an output shaft 41 and an output shaft 42 can be secured, which also easily enables a configuration that connects one of them to a load of a traveling drive shaft or the like, and connects another one to a generator that converts a surplus output power into electric power. In addition, engine auxiliary machines such as a compressor and a generator that are connected in power with the conventional mechanism by a belt or a chain can be directly connected to a larger number of crankshafts than those in the conventional mechanism in the present invention, and the number of components and the engine operation resistance are reduced. According to the present invention, the internal combustion engine can have a compact and efficient configuration.

INDUSTRIAL APPLICABILITY

Since the fuel consumption can be reduced by burning an expensive and variable carbon neutral fuel with low rotation and high efficiency, in addition to which, vibration can be reduced even during low rotation operation, and comfort can also be provided, the present engine can be used in place of the conventional internal combustion engine that is used in an automobile or the like that requires carbon dioxide emission reduction for global environment conservation.

REFERENCE SIGNS LIST 1 intake compression cylinder
2 expansion exhaust cylinder
3 rotating perforated columnar valve
4 ignition combustion chamber
5 seal
6 seal
7 disk cam
8 rocker arm
9 cam contact roller
10 reciprocating opening/closing valve
11 rocker arm holder
12 rocker arm pin
13 input gear
15 piston
16 connecting rod
17 connecting rod connection pin
18 piston pin
19 crank
20 ring seal
21 ring seal
22 leaf spring
23 ring groove
24 lubricating oil supply hole
25 fuel injection device
26 spark plug
27 introduction hole
28 multi-stage fuel injection device
29 guide rail
30 piston pin
31 connecting rod
32 connecting rod connection pin
33 intake valve
34 exhaust valve
35 crank
36 crank
37 piston
38 gear
39 gear
40 disk cam
41 output shaft
42 output shaft
43 crank
44 combustion gas ejection hole

The invention claimed is:

1. An opposed-piston internal combustion engine that is an internal combustion engine comprising an intake compression cylinder and an expansion exhaust cylinder, in an opposed-piston crank mechanism, and comprising a rotating perforated columnar valve and an ignition combustion chamber between the intake compression cylinder and the expansion exhaust cylinder, in which a piston takes in and compresses air at a predetermined timing from an intake valve located on a side surface of the intake compression cylinder, the rotating perforated columnar valve rotates at half a number of revolutions of a crankshaft, the rotating perforated columnar valve has a straight-line introduction hole for passing compressed air, the introduction hole introduces air compressed in the intake compression cylinder into the ignition combustion chamber at a predetermined timing, the compressed air introduced into the ignition combustion chamber by the introduction hole is mixed with a fuel supplied by a fuel injection device installed in the ignition combustion chamber, and starts combustion by ignition of a spark plug installed in the ignition combustion chamber, the ignition combustion chamber has a combustion gas ejection hole for introducing combustion gas generated by the combustion into the expansion exhaust cylinder, the combustion gas is supplied to the expansion exhaust cylinder from the combustion gas ejection hole and expands, the expansion exhaust cylinder has a multi-stage fuel injection device that injects fuel into the combustion gas, the multi-stage fuel injection device increases combustion gas pressure by injecting the fuel into the combustion gas in the expansion exhaust cylinder at a predetermined timing, gas expansion energy of the combustion is converted into power by a piston crank mechanism, and gas after combustion is discharged at a predetermined timing as exhaust gas from an exhaust valve located on a side surface of the expansion exhaust cylinder, wherein respective steps of intake, compression, combustion expansion, and exhaust are completed by one rotation of cranks, pistons are connected to connecting rods, and connecting rods that are symmetrically arranged with respect to the connecting rods, and arranged to face each other in the intake compression cylinder, pistons are connected to the connecting rods, and the connecting rods that are symmetrically arranged with respect to the connecting rods, and arranged to face each other in the expansion exhaust cylinder, the respective connecting rods are connected to the cranks that are symmetrically arranged, and cranks that are arranged to face the cranks, the cranks move in conjunction with each other by gears that are directly attached to the cranks respectively, and gears that have output shafts and are symmetrically arranged, and the gears having the output shafts have rotating shafts that drive the rotating perforated columnar valve in an engine inner side, and transmit rotational power to the rotating perforated columnar valve by the gears.

2. The opposed-piston internal combustion engine according to claim 1, comprising a valve mechanism with a rocker arm arranged on a cylinder side surface side, wherein the valve mechanism has a disk cam having a cam shape in which a cam unevenness amount continuously changes in a diameter direction in addition to a circumferential direction on a disk surface side of a disk rotating in conjunction with crank rotation, a rocker arm that is pressed by the disk cam operates on principle of leverage, the rocker arm has a cam contact roller that contacts the disk cam, at one end, the rocker arm swings by moving in conjunction with a predetermined cam unevenness shape on the disk cam, another end of the rocker arm swings to contact and thereby open and close a reciprocating opening/closing valve, a rocker arm holder holding the rocker arm has a gear portion meshing with an input gear, can move on a straight line by rotation of the input gear on a guide rail, by externally inputting rotation of the input gear, a contact point of the cam contact roller and the disk cam is moved to shift to swing by a different cam shape on the disk cam, at a same time as which, a distance from a point at which the cam contact roller contacts the disk cam to a swing fulcrum of the rocker arm and a distance from the swing fulcrum of the rocker arm to a point of application at which the reciprocating opening/closing valve and the rocker arm contact each other are changed, and an opening/closing amount and an opening/closing timing of the reciprocating opening/closing valve can be adjusted.

3. The opposed-piston internal combustion engine according to claim 2, wherein in the valve mechanism, wherein the cam contact roller is a cam contact ball.

\* \* \* \* \*